United States Patent
Martyniv et al.

(10) Patent No.: US 11,725,953 B2
(45) Date of Patent: *Aug. 15, 2023

(54) PRIVATE AND PERSONALIZED ESTIMATION OF TRAVEL TIME

(71) Applicant: HERE Global B.V., Eindhoven (NL)

(72) Inventors: Andrii Martyniv, Berlin (DE); Olivier Dousse, Berlin (DE); Frank Gaebler, Berlin (DE); Tadej Stajner, Berlin (DE)

(73) Assignee: HERE Global B.V., Eindhoven (NL)

( * ) Notice: Subject to any disclaimer, the term of this patent is extended or adjusted under 35 U.S.C. 154(b) by 286 days.

This patent is subject to a terminal disclaimer.

(21) Appl. No.: 16/267,650

(22) Filed: Feb. 5, 2019

(65) Prior Publication Data

US 2019/0170530 A1 Jun. 6, 2019

Related U.S. Application Data

(63) Continuation of application No. 14/941,065, filed on Nov. 13, 2015, now Pat. No. 10,234,300.

(51) Int. Cl.
*G01C 21/34* (2006.01)
*G01C 21/26* (2006.01)
(Continued)

(52) U.S. Cl.
CPC ......... *G01C 21/3484* (2013.01); *G01C 21/20* (2013.01); *G01C 21/26* (2013.01);
(Continued)

(58) Field of Classification Search
CPC .... G01C 21/3484; G01C 21/26; G01C 21/34; G01C 21/20; G06Q 10/02; G06Q 10/04; G06Q 50/30; G08G 1/096838
See application file for complete search history.

(56) References Cited

U.S. PATENT DOCUMENTS 5,612,881 A * 3/1997 Moroto ............ G08G 1/096844
701/428
6,144,917 A 11/2000 Walters et al.
(Continued)

FOREIGN PATENT DOCUMENTS

DE 102012023575 B3 6/2014
JP 2007168720 A 7/2007
KR 201 50050837 A 5/2015

OTHER PUBLICATIONS

Balakrishnan et al., Demo Abstract PCP: The Personal Commute Taxi Trajectories, Nov. 5-7, 2008, MIT Computer Science and Artificial Intelligence Laboratory.
(Continued)

*Primary Examiner* — Nga X Nguyen
(74) *Attorney, Agent, or Firm* — Lempia Summerfield Katz LLC

(57) ABSTRACT

Route information data records are received from a navigation system indicating road elements and maneuvers between a starting point and a destination point. An estimated time of arrival is established using the route information data records. A personalized correction value based on the road elements, maneuvers, and a driver profile is determined. A personalized time of arrival is calculated based on the estimated time of arrival value and the personalized correction value.

20 Claims, 9 Drawing Sheets

(51) Int. Cl.
*G08G 1/0968* (2006.01)
*G01C 21/20* (2006.01)
*G06Q 10/02* (2012.01)
*G06Q 10/04* (2023.01)
*G06Q 50/30* (2012.01)

(52) U.S. Cl.
CPC .............. *G01C 21/34* (2013.01); *G06Q 10/02* (2013.01); *G06Q 10/04* (2013.01); *G06Q 50/30* (2013.01); *G08G 1/096838* (2013.01)

(56) References Cited

U.S. PATENT DOCUMENTS

| | | | |
|---|---|---|---|
| 8,452,529 | B2 | 5/2013 | Alten |
| 8,682,574 | B2 | 3/2014 | Golding et al. |
| 8,712,682 | B1 | 4/2014 | Liu et al. |
| 8,812,416 | B2 | 8/2014 | Dousse et al. |
| 2010/0049428 | A1 | 2/2010 | Murata et al. |
| 2010/0217519 | A1* | 8/2010 | Englerth ............ G01C 21/3492 701/465 |
| 2011/0106370 | A1* | 5/2011 | Duddle ................ G06Q 40/08 701/31.4 |
| 2011/0112760 | A1 | 5/2011 | Serbanescu et al. |
| 2011/0208417 | A1 | 8/2011 | Fink et al. |
| 2011/0231091 | A1 | 9/2011 | Gourlay et al. |
| 2012/0172025 | A1 | 7/2012 | Hamalainen et al. |
| 2012/0330777 | A1 | 12/2012 | Sathish et al. |
| 2013/0090823 | A1 | 4/2013 | Hoffmann |
| 2013/0246021 | A1 | 9/2013 | Ura et al. |
| 2013/0261970 | A1 | 10/2013 | Papajewski et al. |
| 2014/0180576 | A1 | 6/2014 | Lamarca et al. |
| 2015/0032366 | A1 | 1/2015 | Man et al. |
| 2015/0160020 | A1* | 6/2015 | van Hemert ............ A61B 5/18 701/532 |
| 2015/0168157 | A1 | 6/2015 | Hoch |
| 2016/0375900 | A1 | 12/2016 | Laur et al. |

OTHER PUBLICATIONS

Douglas et al., Algorithm for the Reduction of the Number of Points Required to Represent a Digitized Line or its Caricature, 1973, pp. 112-122, No. 2, International Journal for Geographic Information and Geovisualization 10.
Estimated Arrival Time Accuracy, Jan. 23, 2014, waze.com.
Huges et al., Apple Looking to Improve GPS Route-Planning Estimates, Jul. 20, 2009, appleinsider.com.
Odhams, Andrew MC, and David J. Cole. "Models of driver speed choice in curves." Proceedings of the 7th International Symposium on Advanced Vehicle Control. 2004. pp. 1-6.
PCT International Search Report and Written Opinion of the International Searching Authority dated Jan. 31, 2017 for corresponding PCT/EP2016/077284.
Wang et al., Travel Time Estimation of a Path Using Sparse Trajectories, 2014, Proceedings of the 20th ACM SIGKDD International Conference on Knowledge Discovery and Data Mining.
Yuan et al., T-Drive: Driving Directions Based on Taxi Trajectories, 2010, University of Science and Technology of China.

* cited by examiner

PRIVATE AND PERSONALIZED ESTIMATION OF TRAVEL TIME

This application is a continuation under 35 U.S.C. § 120 and 37 C.F.R. § 1.53(b) of U.S. application Ser. No. 14/941,065 filed on Nov. 13, 2015 and entitled "Private and Personalized Estimation of Travel Time," the contents of which are incorporated herein by reference.

FIELD

The following disclosure relates to estimation of arrival time associated with navigation systems, and more particularly, to the estimation of personalized arrival time while preserving privacy.

BACKGROUND

Navigation systems are frequently equipped to provide estimated travel times and estimated arrival times for a route. Estimation of travel time and arrival time provides a valuable tool to assist drivers in planning and may assist drivers in determining the optimal time of departure. Conventional navigation systems provide estimated trip time and estimated arrival time based on aggregated information from a variety of drivers and traffic conditions, which fails to account for an individual driver's habits and styles when determining the estimated travel time. Conventional systems result in time estimations that may be inaccurate or imprecise for individual drivers.

SUMMARY

In one embodiment, a method for private and personalized estimation of travel time is provided. The method may include receiving route information data records from a navigation system. The route information data records indicate road elements and maneuvers between a starting point and a destination point. The method may further include establishing an estimated time of arrival value based on the plurality of route information data records and determining a personalized correction value based on the road elements, the maneuvers, and a driver profile.

In another embodiment, an apparatus is provided including at least one processor and at least one memory including computer program code for one or more programs. The at least one memory and the computer program code is configured to, with the at least one processor, cause the apparatus to receive a plurality of route information data records from a navigation system and establish an estimated time of arrival value based on the plurality of route information data records. The computer program code and processor may further cause the apparatus to determine a driver profile based on an actual travel time associated with each traveled road element and a maneuver time associated with each executed maneuver. The traveled road elements are each previously traversed by a driver associated with the driver profile, and the executed maneuvers are each previously performed by the driver. The computer program code and processor may further cause the apparatus to determine a personalized correction value based on the route information data records and the driver profile. The computer program code and processor may also cause the apparatus to calculate a personalized time of arrival value based on the estimated time of arrival value and the personalized correction value.

In yet another embodiment, a non-transitory computer readable medium including instructions is provided. The non-transitory computer readable medium may include instructions that, when executed, are operable to receive a plurality of route information data records from a navigation system. The non-transitory computer readable medium may further include instructions that, when executed, are operable to receive an estimated time of arrival value based on the route information data records and determine a personalized correction value based on the plurality of route information data records and a driver profile. The non-transitory computer readable medium may further include instructions that, when executed, are operable to calculate a personalized time of arrival value based on the estimated time of arrival value and the personalized correction value.

BRIEF DESCRIPTION OF THE DRAWINGS

Exemplary embodiments of the disclosure are described herein with reference to the following drawings.

DETAILED DESCRIPTION

Figure 1:
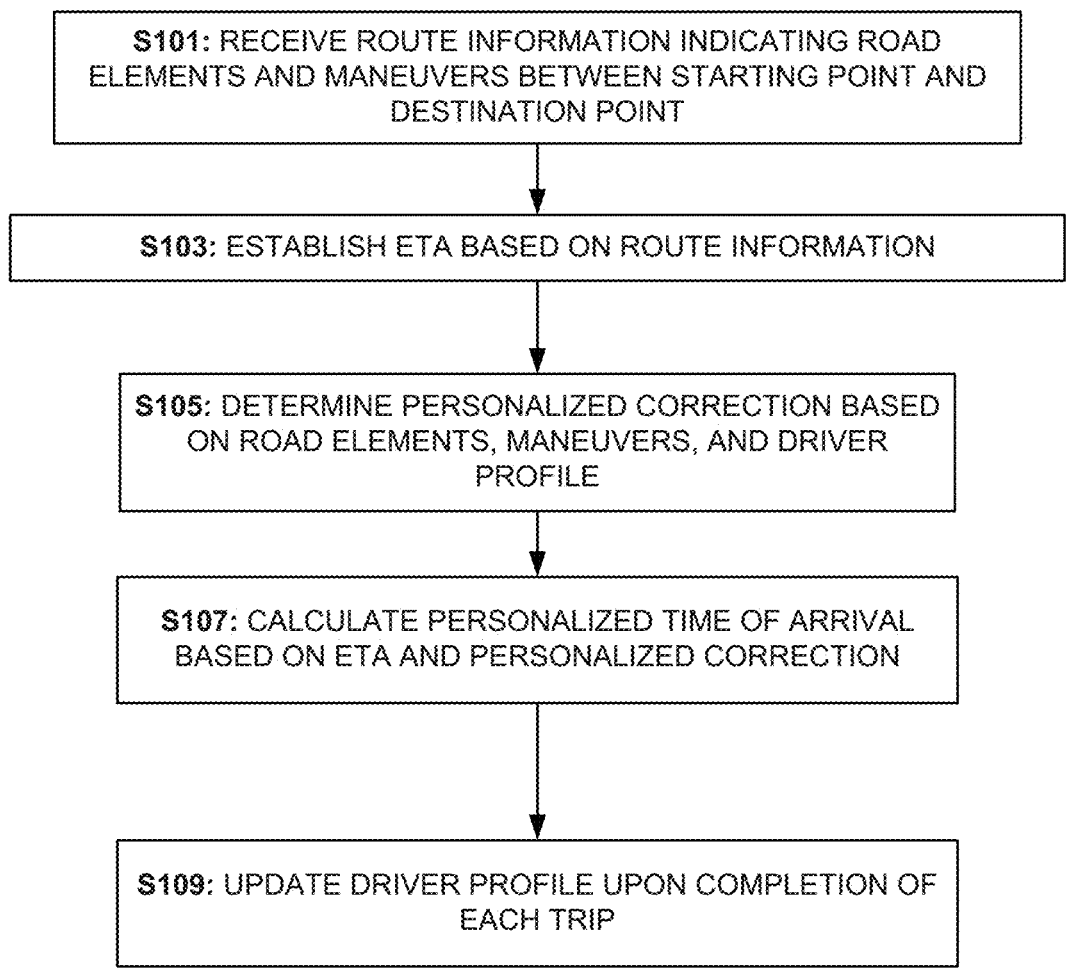
FIG. 1 is an example flow diagram in accordance with the subject technology for personalized estimation of travel time.

Estimated time of arrival information is useful to drivers planning trips and anticipating arrival times. Individual driving characteristics and habits for each driver render a single time estimate for all drivers imprecise. Faster drivers may engage in faster turns than the average driver and may reduce travel time as much as thirty percent as other drivers. Slower or more inexperienced drivers may execute some maneuvers more slowly based on their inexperience. Slower drivers may enter highways or perform other complicated maneuvers at slower rates. Routes with several complicated maneuvers may take an inexperienced driver longer to traverse than simpler routes traversed by the same driver. As much as fifteen percent more time may be taken by an inexperienced or slow driver to navigate complicated routes. A personalized estimation of arrival time may more closely reflect the travel time differences for drivers based on their idiosyncrasies. Personalization values may be ultimately expressed as a multiplier applied to estimated travel time and/or as an addition of time or subtraction of time from the estimated travel time. Personalization may be referred to as a "penalty" or "correction value." An increased estimated travel time results in a later estimated time of arrival.

Personal penalties values may represent faster and slower habits using positive and negative values or by using multipliers less than one or greater than one. Many conventional navigation systems determine time estimation based on the driver's previous trips along the same geographic route, such as repeated trips from the same starting point to the same destination point using the same streets. Collecting, logging, and storing information associated with a driver's location and times of travel may create an unintentional record of the driver's exact time and location or may create a record of driving infractions that a driver prefers not to be share or accessed by others. Privacy is provided in the current embodiments by classifying roads based on the characteristics of each stretch of road and not by geographic location or name. Accordingly, habits of the driver may be determined without using or storing information associated with specific locations, travel dates, and travel times of the driver. In some embodiments, personalized estimated time of arrival may be computed entirely locally on the driver's vehicle navigation system or mobile device obviating the need to transmit any identifying driving profile information over a network. Alternatively, driver profiles may include only non-geographically specific information and may use only generalized time of day information that may be transmitted over the network, with personalization of estimated travel time computed remotely from the vehicle or mobile device. The driver profile may be stored locally on the driver's vehicle or mobile device, with only calculated driving correction values sent over a network for computation by a remote server.

The personalized correction value is determined based on the driver's performance on all road segments and maneuvers sharing the same characteristics, generally meaning that data from a larger quantity of driver experiences will be considered than in systems considering only the driver's previous experience on the same road. With the additional applicability of feature driven estimation instead of non-geographically based estimates, a personalized estimation of travel time or estimated time of arrival can be determined for routes that have been previously untraveled by the driver. Travel times and/or estimated times of arrival may be determined for any portion of the route. For example, a driver may plan a multi-leg trip and obtain travel times and/or estimated time of arrivals for the destination and each intermediate leg of his trip.

Upon creating a new driver profile, no driving history may be associated with the driver and no penalties or prediction correction values may be applied to estimated time of arrivals until the driver profile is established. The vehicle navigation system or mobile device may receive route information and route traffic information from the navigation cloud to determine estimates, travel times, and previously driven routes for storage with the driver's profile. The driver's profile may include calculated personalization correction values based on the information determined locally via the navigation system of the vehicle, information collected via sensors on the vehicle, or with the mobile device. The routing module may receive route traffic and route information from the navigation cloud while the driver is in transit. Once receiving this information, the navigation system or mobile phone may determine the route details, determine the driver's correction value for the determined route, and provide the travel time penalty to the routing module.

The subject technology for personalized estimation of travel time uses the driver's history to determine individual penalties for specific road elements and specific maneuvers based on the driver's performance on actual road elements and maneuvers of similar types to the proposed navigation route. A driver's profile stores the rate or total travel time of completed trips and trip segments, estimates, and characteristics of routes driven by the driver including the length of road elements, the characteristics and features of the road elements, and number of maneuvers of a specific type. The personalized penalties are used to adjust standard travel time estimation to get personalized travel time estimation.

A goal is to provide personalization of estimated arrival times without transmitting personal information over a network by provide a system and method for personalizing estimation arrival time that may be performed locally on the navigation device. Privacy is also provided because geographic locations and specific date and/or times are not used to determine the driver profile. A second layer of privacy is provided because future routes may be calculated using a personalized correction value that is non-referential to any particular location or specific, temporal information associated with the driver. Benefits of the system and method are especially provided on longer trips because timing of longer trips is typically less dominated and determined by traffic signalization. Actual length of trip and arrival time are dependent on both the driver and the road properties, but many conventional solutions rely only on static speed rates for road elements as a function of speed limits and historic speeds of many travelers gathered from probe data. Some conventional solutions use dynamic traffic-aware penalties and flow measurements to provide precise estimations of speed. This strategy requires up-to-date traffic information but generally provides better travel time estimates. These conventional strategies can be improved by further personalization of estimated travel times and expected time of arrival based on the specific habits of the driver on similar roads. A benefit is provided by making personalized models that are effective in areas where no reliable traffic data is available; that is, the personalization model may be used as an implicit local traffic model when information is unknown.

More accurate estimated arrival time is reflective of the driver's personal habits in combination with speed limit and generalized traffic information (such as historical averages). Estimated arrival time is also possible in instances where generalized traffic information is not available, and only the driver's personal habits. Unlike conventional methods that calculate only average highway speeds and include the average speed for travel time calculations, the disclosed embodiments determine the driver's estimated travel time for individual road segments and individual maneuvers based on a set of factors characterizing each individual road segment and individual maneuver.

FIG. 1 is a flow chart of a method of the subject technology for personalized estimation of travel time that may be performed by server 125 operating in a "prediction" mode as described in FIG. 1. The system may further operate in a second mode, a "training" mode as described with respect to FIG. 3. The prediction mode occurs when a new trip, $tr_i$ is encountered. A new trip may be detected by observation of the navigation system. Trip features $x_i$ and baseline estimated time of arrival, $t_{base,i}$, may be known while actual trip time, $t_{true,i}$, will remain unknown until the trip is taken. Acts are described with reference to the system and components depicted in FIGS. 6-8. Additional, different, or fewer acts may be provided. Acts may be performed in orders other than those presented herein.

In act S101, server 125 receives a plurality of route information data records from a navigation system, wherein the plurality of route information data records is indicative of a plurality of road elements between a starting point and a destination point and a plurality of maneuvers between the starting point and the destination point. Trip or route distance may be determined based on route information data records obtained from a navigation system. Route information data records may include some or all portions of a route from a starting location to a destination location. The route information data records may include road elements and road maneuvers. A road element is a length of road with an associated set of features. A road maneuver includes changes in movement or direction necessary or beneficial to traversing a route. A trip may include any number and combination of road elements and road maneuvers. Each trip may have multiple possible routes, each having its own set of road elements and/or maneuvers connecting the starting location to the destination location.

A benefit is provided by estimating travel times directly from the estimation of correction factors based on features of individual road elements and maneuvers. Due to the estimation of arrival times using features of road elements and road maneuvers allows personalized estimation of arrival times for unknown routes (i.e., routes the driver has never before traveled). Feature based estimation of arrival times further does not limit the estimated time of arrival factors to individual classes of routes. That is, a benefit is provided by increasing a greater generalization potential on previously unobserved routes. Feature based estimations of arrival time according to the disclosed system and method are also not limited to estimates for trips including only one route class because features of the road elements and maneuvers are classified individually and not based on characterization of every road as a unique set of features. Accordingly, personalization information may be determined based only on physical features of road elements that the driver has previously traversed.

The structure of the driver profile is constructed to preserve privacy. Metadata associated with the driver profile does not include literal identifiers of any road elements, road names, or any information that would be instrumental in determining the driver's mobility history. Although times of day days of week or other temporal pieces of data may be collected, a history of the driver's trips need not include a log of the exact date and time that the driver has traversed any specific route.

The term "road elements" as used herein encompasses its plain and ordinary meaning, including, but not limited to characteristics and/or features of a length of road or path. Examples of road elements may include: classifications of road lengths as urban, highway, toll road, tunnel, slip road, single or multi carriage (roads having no central divider or divided road), road class, type of terrain, or any other feature. Road elements may further provide for specific features associated with traffic cameras. Road element data may be determined from road element metadata stored in the map database as road element identification data.

Road element features from the map database may include but are not limited to: speed limit, plural type (one of none, maneuver, connector, indeterminate), number of lanes, pedestrian, functional class (which may be a categorical variable having values from 1 to 5, where 1 is the highest level and 5 is the lowest), form of way (which may be a categorical variable, within a road element such as identified as a motorway, sliproad, single carriageway, dual carriageway, multi carriageway, roundabout, pedestrian walkway, or pedestrian zone), flags (which may be any number of noThroughRoad, motorway, tunnel, tollroad, dirtRoad, builtUpArea, HOVLane, boatFerry)), base time (which may be base estimated travel for traversal of road elements (in seconds)), base speed (which may be base estimated speed for traversal of road element (in meters/second)), urban (indicating the road element is in an urban area), tunnel (road element is a tunnel), tollroad (road element is on a toll road), sliproad (road element is a slip road), rail_ferry (road element has a rail ferry connection), no through traffic (no traffic possible on road element), no cars (no car traffic possible on road element), highway (road element is a highway), ferry (road element has a ferry connection), carpool (road element has a carpool lane), both (traffic possible in both directions), forward (traffic possible in forward direction), and backward (traffic possible in backward direction). Road number and road name may be metadata available via the query but not used as a feature for the preservation of privacy.

Categorical features of road elements (e.g., flags, form_of_way, and plural_type) may be encoded as numerical features using one-hot encoding; that is, the category may be represented by only one feature in a group of features, where the represented feature has the value "1", while the remaining features have the value "0". These types of mutually exclusive features such as type of terrain (e.g., gravel, asphalt, concrete, or dirt) will ultimately comprise one hundred percent amongst the related properties of the feature. Other features may be independent, and a road element may have multiple features.

Any track may be composed of several road elements, with the final value of every feature for track tr calculated as a length-weighted sum across the set of road elements RDE(tr) as given by Equation 1:

$$\text{element } feature_i(tr) = \sum_{e \in RDE(tr)} \frac{length_e \text{ element } feature_i(tr)}{\sum_{e \in RDE(tr)} length_e} \quad \text{Eq. 1}$$

Normalization provides the benefit that longer distances of road elements result in a proportionally larger contribution to the personalization correction value.

The term "maneuvers" as used herein encompasses its plain and ordinary meaning, including, but not limited to characteristics and/or features of a movement that may be executed on a roadway. Examples of maneuvers may include: round about (with number of exits), U-turn, enter highway left or right, leave highway left or right, keep left or right—light, quite, heavy, stopover or any other feature.

Road maneuvers may be determined from the road element sequences in route information data records. Examples of maneuvers may include features such as action or direction. Action features may include one or more types of action including, but not limited to: depart, continue, arrive, name change, left ramp, right ramp, left merge, right merge, left turn, right turn, slight left turn, slight right turn, sharp left turn, sharp right turn, left fork, middle fork, right fork, left exit, right exit, theory, left roundabout pass, right roundabout pass, left U-turn, right U-turn, right roundabout enter, right roundabout exit 1—right roundabout exit n left roundabout enter, left roundabout exit 1—left roundabout exit n.

Examples of direction features may include one or more directions including but not limited to: forward, left, right, light left, light right, bear left, bear right, U-turn left, U-turn right, hard left, or hard right. Maneuvers may be normalized based on the number of maneuvers per trip. Because every track has multiple maneuvers, the final value of every feature, i, of track tr may be calculated as an average across the entire set of maneuvers as given by Equation 2:

$$\text{maneuver } feature_i(tr) = \frac{\sum_{e \in M(tr)} \text{maneuver } feature_{ij}(tr)}{|M|} \quad \text{Eq. 2}$$

By creating a driver profile that is a continuous model of travel factors as a function of route features, it is not necessary to classify whole routes in discrete classes containing only one set of travel factors describing the entire route. Road element and maneuver based classification provides the benefit that a route may be characterized by multiple classes and features without limitation to one particular class. Unlike conventional methods that require the storage of a driver's history of trips on given routes on both local devices and or remote servers, the driver's locations, times, and other identifying information are unnecessary. Some conventional methods use estimated time of arrival based on routes frequently traveled by other drivers to interpolate for cases where the driver has not previously traversed the route. Greater flexibility is provided by determining personalization through individual types of road elements and maneuvers so that other driver profile data sets need not used in determining personalization correction values. In addition to preserving privacy, a further benefit is provided by personalizing estimated times reflecting variations of individual driver's habits based on different road element and maneuver features, such as driving in urban areas as compared to rural areas or highways compared to regional roads. Such personalization generally improves the estimated time of arrival in addition to providing drivers estimated times of arrival based on personal habits for those drivers frequently travelling through areas without current traffic coverage.

Each route or part of route may be represented as a vector. For road element types, the total length of the given types occurring in the route may be determined. For each maneuver type, the number of occurrences of each type of route may be determined. All routes traversed by the driver may be represented as a matrix of route vectors A. Each route has an actual driving time Y, recorded by the navigation system and an original estimation of the route, Z, which may include current traffic conditions. Thus, the personalize penalties X can be approximated by Equation 3:

$$AX \approx Y - Z \quad \text{Eq. 3}$$

The system may be viewed as a multivariate regression model and solved with known methods such as the regularized least square method. For a new route, the personalization correction value or penalty may be calculated as Equation 4:

$$P = R^T X \quad \text{Eq. 4}$$

where the characteristics of the route is represented by R.

The personalized route estimation E may be calculated as Equation 5:

$$E = P + Z \quad \text{Eq. 5}$$

A linear model may alternatively be used, solving the personalization as Equation 6:

$$W'X + b = \hat{y} \approx \frac{t_{base}}{t_{true}} \quad \text{Eq. 6}$$

where the track matrix, X, includes rows representative of tracks and columns representing features. The base travel time estimate $t_{base}$, and actual travel time is given by $t_{true}$. The correction ratio between $t_{base}$ and $t_{true}$ is provided as $$\hat{y} = \frac{t_{base}}{t_{true}}$$

and $\psi: X \to \hat{y}$ is a predictor that estimates the correction ratio of a trip given its features. W and b represent the model parameters (abbreviated as $\theta = (W, b)$), and W is a vector with values representing each feature's effect on the estimated arrival time ratio. Positive values for $W_i$ indicate the ratio should be increased, thus, estimating a faster trip with b representing the intercept constant that represents the default. Values for $x_i$, $t_{base, i}$, and $\theta = (W, b))$ may be obtained, and the correction ratio may be calculated as Equation 7:

$$\widehat{y_i} = W^{\alpha_i} + b \quad \text{Eq. 7}$$

The personalized estimated time of arrival may then be obtained as Equation 8:

$$\hat{t}_t = \frac{t_{base,i}}{\widehat{y_i}} \quad \text{Eq. 8}$$

One alternative non-linear model for may be provided as Equation 9:

$$\Psi(X; \theta) = \hat{y} \approx \frac{t_{base}}{t_{true}} \quad \text{Eq. 9}$$

for any supervised predictive regression model, $\psi$, with internal parameters, $\theta$, that are appropriate for the learning algorithm (even in embodiments not expressed by (W, b)).

In act S103, server 125 or mobile device 122 establishes an estimated time of arrival value based on the plurality of route information data records. The estimated time of arrival may include a determination of actual traffic flow information and historical traffic patterns to determine the expected traffic speed. Alternatively, or additionally, estimated times of arrival may use live traffic updates to enhance the accuracy of the underlying estimated time of arrival before personalization of the estimated time of arrival. A traffic analytics service providing historical traffic patterns may be used to generate approximations of traffic-aware estimated times of arrival that serve as baselines. Historical traffic patterns may include a confidence value may be associated with the data. A threshold confidence value such as fifteen percent confidence of accuracy may be used as a minimum threshold so that only data points with a minimum confidence level are considered for estimates of arrival time. Road element velocity may be obtained using the selection of traffic features including mean (average velocity in the current interval), stdev (standard deviation of velocity in the current interval), minimum (minimum observed velocity in the current interval), and maximum (maximum observed velocity in the current interval). Traffic features may be transformed by Equation 10:

$$\text{traffic } feature_i(tr) = \sum_{e \in RDE(tr) \text{confidence}_e \geq 15} \frac{length_e}{\text{traffic } feature_i} \quad \text{Eq. 10}$$

In some instances, the traffic aware estimate and the non-traffic aware estimate may be determined as a feature constituting the ratio of historic traffic speed and the non-traffic-aware estimate as historic_traffic_speed and travel_time.

Traffic flow information may be used to determine travel time for individual road elements. An estimated (non-personalized) arrival time may include no traffic information and may be determined based on map data information, speed limits, geometry. Probe data may determine average driving speed and turning time for road segments. The length of the trip may be determined by aggregate travel time for all road elements and maneuvers. Estimated travel time $t_{base}$ of trip tr may be provided by Equation 11:

$$t_{base} = \sum_{e \in RDE(tr)} \frac{length_e}{basespeed_e} + \sum_{m \in M(tr)} turntime_m \qquad \text{Eq. 11}$$

where trip (tr) includes road elements RDE(tr) and maneuvers M(tr). Each road element has a physical length, $length_e$, and base speed, $basespeed_e$. Estimated travel time may use either predicted, current traffic flow, or a combination of information based on actual traffic flow information and historical traffic patterns for individual road elements, Expected traffic speed may be used for $basespeed_e$ if and when expected traffic speed is slower than the base speed. Current traffic information may reflect traffic jams based on a threshold (such as a threshold associated with speed value in miles per hour or kilometers per hour, a speed value in miles per hour or kilometers per hour under the speed limit, or a threshold reflecting a percentage under the posted speed limit). Both personalization estimated time of arrivals and general estimation of time of arrival will then reflect traffic congestion.

In act S105, server 125 or mobile device 122 determines a personalized correction value based on the plurality of road elements, the plurality of maneuvers, and a driver profile. The personalized correction value may be a ratio of the estimated time of arrival value. The term "personalized correction value" is determined from the driver profile. The personalized correction value may be a function of the track features.

The personalized correction value or ratio, ŷ, may be estimated using a supervised regression model ψ: X→ŷ to establish the relationship between features, X, of road elements to and the personalization correction ratio, ŷ. Any number of regression models may be effectively used. Non-limiting examples of regression models include: Ridge Regression, Extremely Randomized Tree (ExtraTrees) Regression, Support Vector (SV) Regression, K-Nearest-Neighbor (KNN) Regression, and Gaussian Process (GP) Regression. In the Ridge Regression model, the regression model is linear with the least-squares lost function and $l_2$ normalization regularization. The ExtraTrees Regression model is a decision tree ensemble, we are decision trees are constructed by randomizing both attribute and cut point choices. The SV Regression model solves a linear regression model with the ∈-insensitive loss function and $l_2$ normalization regularization. KNN regression estimates the personalization correction ratio by interpolating the values of the k closest observed examples. GP regression models ŷ as a Gaussian random variable, with ψ predicting its mean.

In act S107, server 125 or mobile device 122 calculates a personalized time of arrival value based on the estimated time of arrival value and the personalized correction value.

The personalized estimation of time of arrival may be computed and dynamically updated throughout the trip, even if the personalized correction value is the same as the generalized estimated time of arrival. Updating periodically or in real-time (i.e., no humanly perceptible delay) accommodates any changes in traffic or route that may result in differences between estimated time of arrival and personalized estimated time of arrival further along the route. Dynamic estimation of personalized travel time while en-route may only consider factors of road elements and maneuvers still remaining in the route. Accordingly, accuracy in personalized estimated time of arrival may be maintained throughout the route. Personalized correction values may be computed for the entire trip or may be computed based on a portion of the trip.

In act S109, server 125 or mobile device 122 updates the driver profile upon completion of each trip. Over time changes to the driver profile will be minimized as the driver's profile converges due to a large amount of data records acquired based on the road maneuvers and road elements traversed during trips taken by the driver. In comparison, driver profile may exhibit larger relative improvements to personalization as the driver's profile gathers data to accurately and precisely predict the driver's behavior on a wide variety of different features over a wide variety of road elements and maneuvers. Establishing and/or updating the driver profile may be referred to as "training" mode.

The system may continue to store data accumulated during trips in order to refine the driver profile and to accommodate any habit changes of the driver. For example, over time, a driver may become more comfortable on highways or in heavy traffic. Over time the driver's habits may reflect that the driver increases his speed through road elements and maneuvers as he gains more experience with highways and in heavy traffic. A driver's repeated routes, while not recorded in a manner geographically identifying the exact location and times of the driver's trips, the driver's experience and level of comfort will be reflected in the repeated updating of the driver profile based on repeated features of road elements and maneuvers in the repeated route. Personalized estimated value may be recalculated in real time while en-route, maintaining accuracy throughout the trip, the driver profile may only be updated at the completion of each trip to accurately assess features of the road elements and maneuvers that may occur throughout the trip. The updated driver profile may be determined by comparing the estimated travel times with the actual travel times.

The observation and updating of data based on every trip is provided using mathematical n-notation of the driver profile such that every trip can be characterized by "n" number of parameters and the proportional of the trip containing a particular road element or maneuver. The proportion of a road element to a trip may be based on distance or length of the road segment having certain properties. For example, approximately twenty-five percent of a trip may include urban driving while the remaining seventy-five percent of the trip is located on road segments in rural areas based on the number of miles or kilometers of urban road in proportion to the total distance travelled. As with the urban and rural driving example, some features may be related to others such that a proportional relationship representing one hundred percent exists amongst subsets of features describing each trip.

Figure 2:
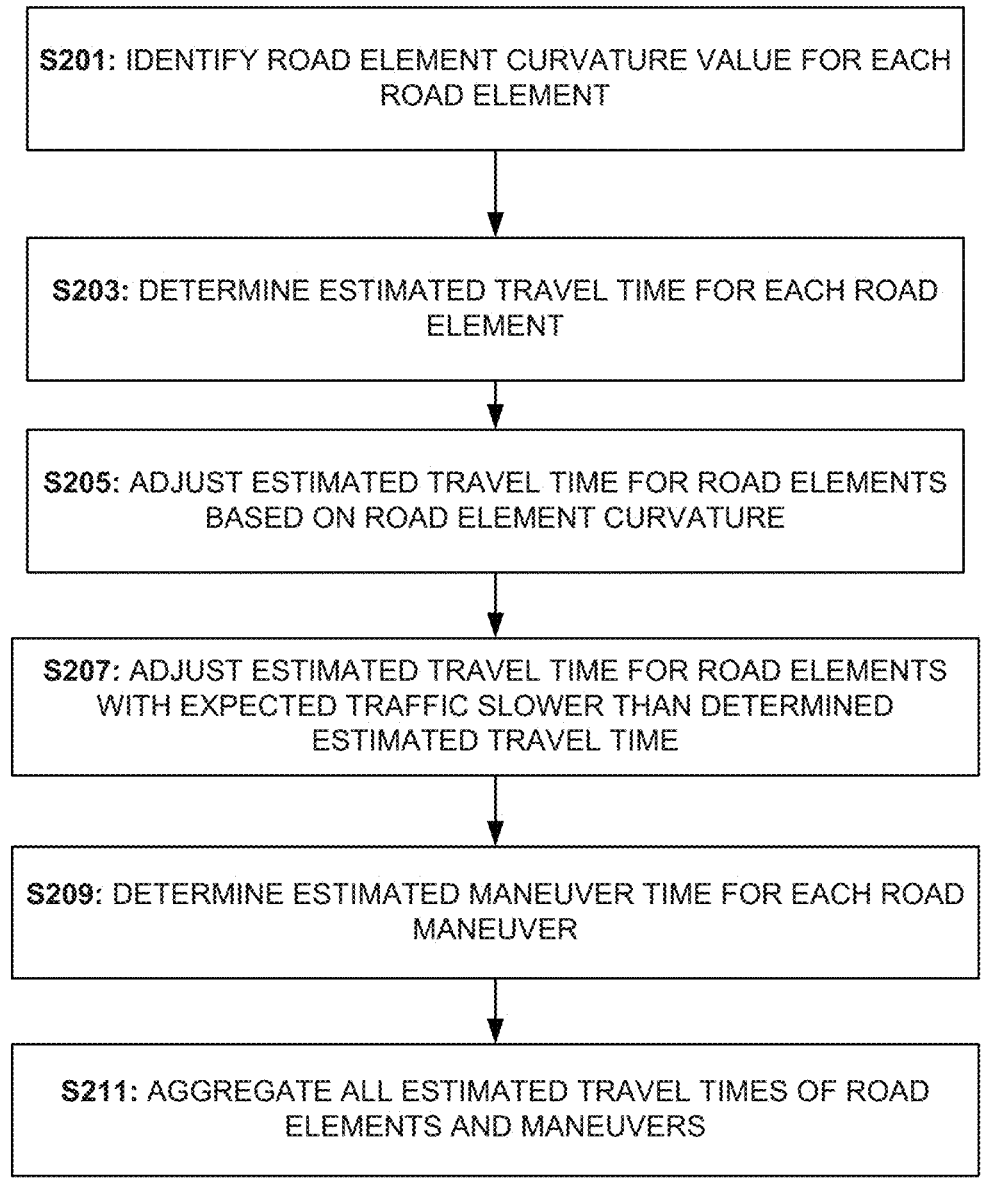
FIG. 2 is an example flow diagram in accordance with the subject technology for personalized estimation of travel time.

FIG. 2 is a flow diagram in accordance with the subject technology for personalized estimation of travel time that may be performed by server 125 for embodiments factoring in road element curvature and/or current traffic (traffic aware) estimates of travel time and may be performed in embodiments along with some or all of the acts of FIGS. 1 and 2. In some embodiments, road element curvature values and current traffic conditions may be identified and considered in time estimation. Acts are described with reference to the system and components depicted in FIGS. 6-8. Additional, different, or fewer acts may be provided. Acts may be performed in orders other than those presented herein. Each of the acts of FIG. 2 may be performed by either server 125 or mobile device 122, although described below in the context of only server 125.

In act S201, at least one road element curvature value is identified for each of the plurality of road elements between the starting point and the destination point. Road elements of a track may be identified by at least two shape points. The geometry of the road curvature may be constructed by assembling all shape points from all road elements. The number of points representing the curve may be reduced using an iterative end-point fit algorithm to identify curves defined by fewer points while maintaining no more than a pre-determined distance between the original curve and the simplified curve. An iterative end-point fit algorithm such as the Ramer-Douglas-Peuker algorithm may be applied to reduce the number of points while preserving the general shape of the road within a tolerance of one meter. The curve may then be approximated using a univariate parametric spline of degree three (a cubic spline). Curvature, K, may be estimated at any point along the spline given the spline's first and second derivatives for both axes as given by Equation 10:

$$K = \left| \frac{\dot{x}\ddot{y} - \dot{y}\ddot{x}}{(\dot{x}^2 + \dot{y}^2)^{1.5}} \right| \qquad \text{Eq. 10}$$

Following the spline fitting, uniformly distributed curvature samples $K_i \in K_{samples}$ (one thousand samples is exemplary number of samples) along the curve. Those samples may be reduced to a histogram with bin values as pre-defined limits of their log values. The range of pre-defined limits of log values may be divided into six intervals. For every bin b defined by the interval (lower$_b$, upper$_b$)$_n$ its feature value may be computed via Equation 11:

$$\text{curvature } frequency_b = \qquad \text{Eq. 11}$$
$$\frac{|\{i; lower_b \le \log K_i < upper_b, K_i \in K_{samples}\}|}{|K_{samples}|}$$

The resulting feature values may be determined for each road element in a route for the estimated time of arrival in the same manner as all other feature values of road elements and maneuvers as described above. Alternatively, in act S203, server 125 determines the estimated travel time for each of the plurality of road elements. In act S205, server 125 adjusts the estimated travel time for road elements based on road element curvature after the determination of estimated travel time based on features of the road elements.

Some embodiments may adjust an estimated travel times based on current traffic conditions only if the expected traffic travel time is slower than the determined estimated travel time, as in act S207. Expected traffic time may be determined from historical averages amongst many drivers or from current traffic-aware information received by server 125 and/or mobile device 122. Historical averages may be obtained without requiring personalized information using method and system disclosed herein.

In act S209, server 125 determines an estimated maneuver time for each of the plurality of road maneuvers and evaluates any adjustments to the estimated travel time for each road element.

In act S211, server 125 aggregates all estimated travel times of the plurality of road elements and all estimated maneuver times for the plurality of road maneuvers.

Figure 3:
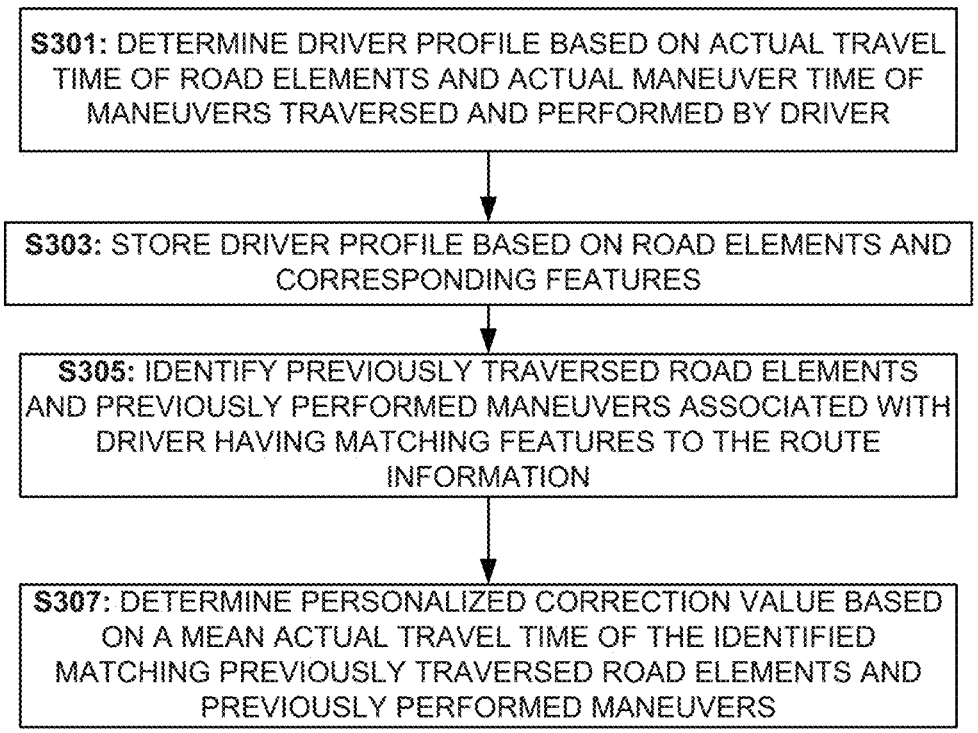
FIG. 3 is an example flow diagram in accordance with the subject technology for personalized estimation of travel time.

FIG. 3 is a flow diagram in accordance with the subject technology for personalized estimation of travel time that may be performed by server 125 or mobile device 122 and may be performed in embodiments along with some or all of the acts of FIGS. 1 and 2. FIG. 3 includes acts performed while the system is in a training phase in which the driver profile is created, augmented, or updated. The training phase may occur to update model parameters $\theta = (W, b)$, and the driver profile may be updated at end of each completed trip. The end of the trip may be established by identifying when the vehicle reaches the specified destination point. Alternatively, or additionally, the end of the trip may be determined based on the destination point and the state of vehicle sensors 126 (e.g., the vehicle engine is turned off). Acts are described with reference to the system and components depicted in FIGS. 6-8. Additional, different, or fewer acts may be provided. Acts may be performed in orders other than those presented herein. Each driver profile may be determined on a per-driver basis, with each driver having a separate profile. Personalized traffic estimation information from a driver profile may be sent to server 125 for use within anonymously averaging results from individual driver profiles across larger sets of drivers.

In act S301, performed by either the server 125 or mobile device 122, determines the driver profile based on an actual travel time associated with each of a plurality of traveled road elements and a maneuver time associated with each of a plurality of executed maneuvers wherein the plurality of traveled road elements that are each previously traversed by a driver associated with the driver profile and the plurality of executed maneuvers are each previously performed by the driver. The driver profile may be determined from all the trips from the driver's history by generating the features, X, and obtaining actual trip times $t_{true}$ and their corresponding baseline estimated times of arrival $t_{base}$. Model parameters $\theta$ may then be obtained by solving Equation 6. The driver profile may include data points representing road lengths and may be composed from a list of traversed road elements and a list of maneuvers such that features of road elements may be represented from the perspective of road lengths.

The driver profile may include at least one part-of day, day of week, or weekday and weekend feature associated with ones of the plurality of previously traversed road elements associated with the driver or ones of the plurality of previously performed maneuvers associated with the driver. Temporally based features may be binary encoded categorical groups of features in which only one feature of the group may be stored as a high (1) bit and each of the remaining features of the group may be stored as a low (0) bit (sometimes called one-hot binary encoding). Categorical groups may include: part of day (night, morning, midday, afternoon, or evening), day of week and weekday or weekend flags. Features belonging to categorical groups with only one high bit in the group include only mutually exclusive features. For example, the time-of-day feature associated with each road length of a trip traversed by the driver can only indicate either night or day using a high bit indicating the time-of-day of the travel. Another example of categorical group of time-of-day may include the group of morning, midday, afternoon, or evening.

In act S303, mobile device 122 stores the driver profile based on features of the road elements and maneuvers. Values for each feature may be stored for both the actual travel time and the non-personalized estimated travel time for each feature such that a ratio of actual travel time and estimated travel time is known. The driver profile may alternatively or additionally store equal ratios, decimal or percent, providing a further degree of privacy. Mobile device 125 may determine an equal ratio, decimal, or percent, and provide only the resulting values to server 125 in embodiments in which the driver profile is stored on server 125 or in embodiments in which the driver profile is sent to server 125 for aggregation with other driver profiles for use in creating historical driving statistics.

Acts S305 and S307 provide a further illustration of acts S105 and S107 in the context of the driver profile. Acts S305 and S307 may be performed by either mobile device 122 or server 125. In act S305, similar road lengths are identified in the driver profile based. Identification may be based on shared characteristics of the road lengths and maneuvers present in the driver profile. A plurality of previously traversed road elements and associated with the driver and a plurality of previously performed maneuvers associated with the driver with matching features to the plurality of route information data records are identified without requiring any identifying road location or road name information and enabling personalization for previously unexplored routes of the driver.

In act S307, the personalized correction value is determined based on a mean actual travel time of the identified matching previously traversed road elements and previously performed maneuvers. The personalized correction value may be any expression of the driver's habits as compared to estimated times. The personalized correction value may be a coefficient that is determined based on a coefficients vector of the same size as the number of road elements and maneuvers. The personalized correction value may also be a coefficients vector of the same size as the number of features of the road elements and maneuvers in the trip, obtained from the driver profile (which may constitute a coefficient matrix, with one value per feature of each road element and each maneuver in the matrix). The use of a coefficients accommodates any numeric description of a feature, providing flexibility in the quantization of the features. The data records accumulated for each features may be expressed as decimals or percentages of each road element or maneuver quantifying how the driver performs compared to estimated times.

A personalized correction value of zero may indicate that the driver is aligned with the average speeds of drivers of the determined features of road elements and maneuvers. Positive numbers may indicate faster speeds on that feature of road elements. Negative numbers may indicate slower habits.

Figure 4A:
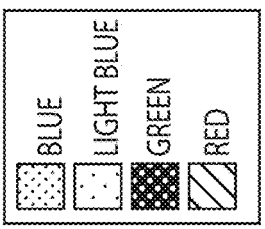
FIG. 4A illustrates example implementation model results in accordance with the subject technology for personalized estimation of travel time.
Figure 4A:
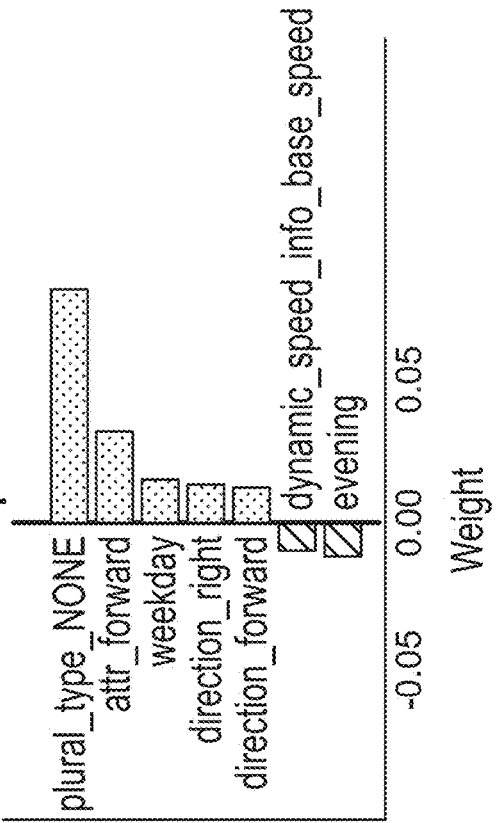
Figure 4A:
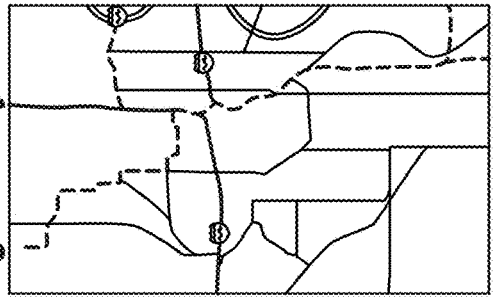
Figure 4A:
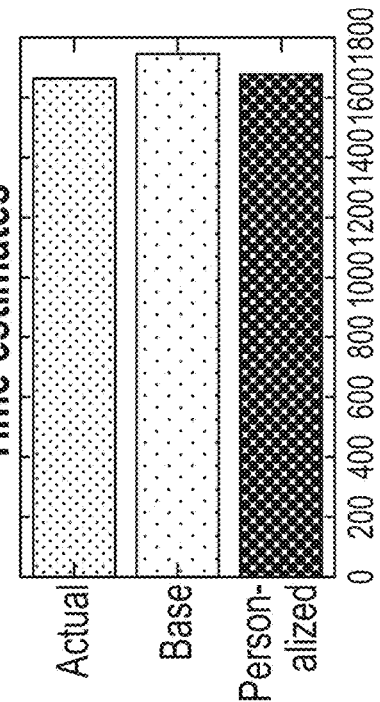
Figure 4B:
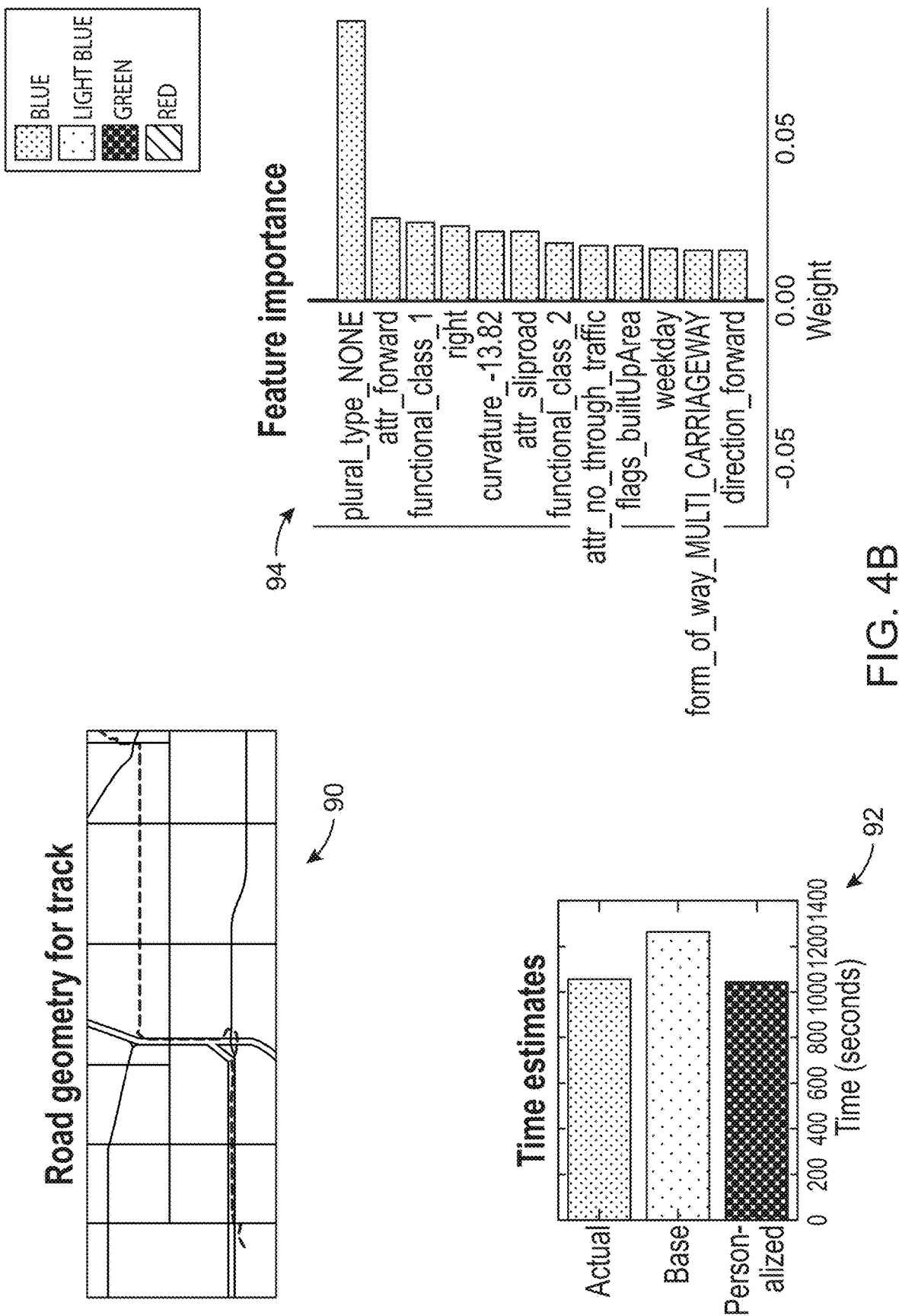
FIG. 4B illustrates example implementation model results in accordance with the subject technology for personalized estimation of travel time.

FIGS. 4A-4B illustrate example implementation model results in accordance with the subject technology for personalized estimation of travel time. These figures show traffic predictions for the same driver with no traffic annotations. Map 90 in each respective figure illustrates a map of the trip estimated in graphs 92 and 94. Graphs 92 of these figures illustrate estimated time of arrival estimates along with the ground truth (i.e., the actual travel time). The graph 94 in each of these figures illustrate which features contributed most to the personalized time estimations. In graphs 94, bars located on the right side of the vertical axis increase the personalized correction value (predicting a shorter estimated time of arrival), while bars on the left side of the vertical axis decrease the personalized correction value (predicting a longer estimated time of arrival). The trip represented in FIG. 4A occurred in the evening. The time of day penalized the predicted estimated time of arrival, resulting in more conservative estimates than otherwise generally occur on this particular road. FIG. 4B shows a different road, where low curvature and prevalence of multi-lane carriageways suggests a faster driving style for this driver with respect to low curvature feature and multilane carriageway feature.

Figure 5:
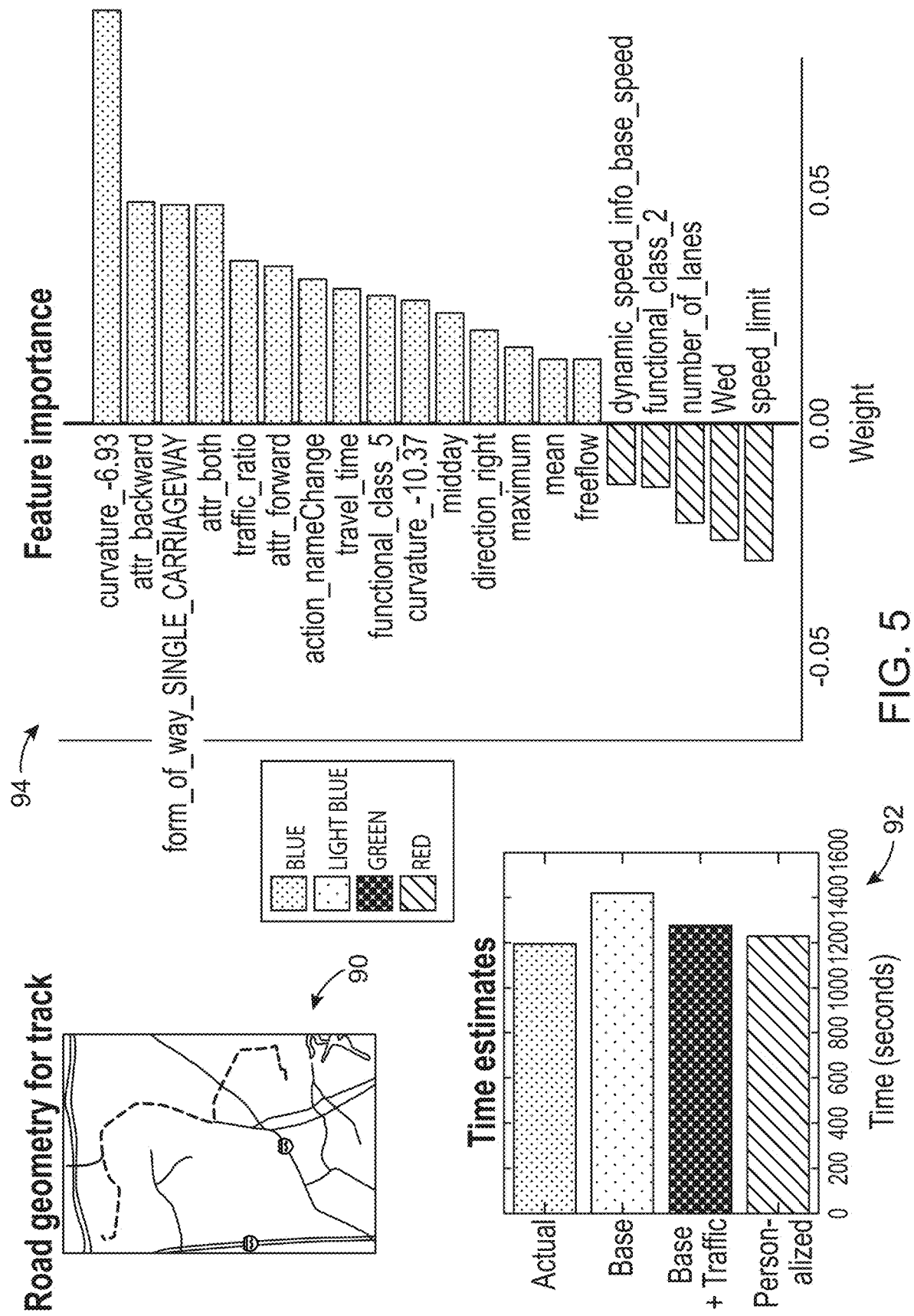
FIG. 5 illustrates example implementation model results including traffic annotations in accordance with the subject technology for personalized estimation of travel time.

FIG. 5 illustrates example implementation model results in accordance with the subject technology for personalized estimation of travel time. FIG. 5 differs from the driver of FIGS. 4A-4B. FIG. 5 includes estimated times of arrival including traffic (Base+Traffic). Map 90 in the figure illustrates a map of the trip estimated in graphs 92 and 94. Graphs 92 illustrate actual travel time (i.e., ground truth), base estimated travel time (Base), base estimated traffic-aware travel time (Base+Traffic), and personalized estimated travel time. Graph 94 illustrate which features contributed most to the time estimations. In the trip of FIG. 5, a positive weight (illustrated as bars to the right of the vertical axis) is determined on moderate curvature suggesting a faster than average driving style on curvy roads. Graph 94 show a strong negative weight (illustrated as bars to the left of the vertical axis) for multilane roads, suggesting slower than average driving habits on motorways and a very strong negative signal from higher speed limits. The use of traffic annotations, i.e. traffic features, exhibit greater accuracy in the predictions. In FIG. 5, the estimated traffic-aware travel time predicts a faster trip than the non-traffic aware time estimate due to light traffic due to. A positive weight in graph 94 for multiple features including maximum, mean, and freeflow. The actual travel time further resulted in a faster estimated time of arrival then provided by either of the base estimated times (Base or Base+Traffic). Average base time estimates may result in a slight conservative bias.

Figure 6:
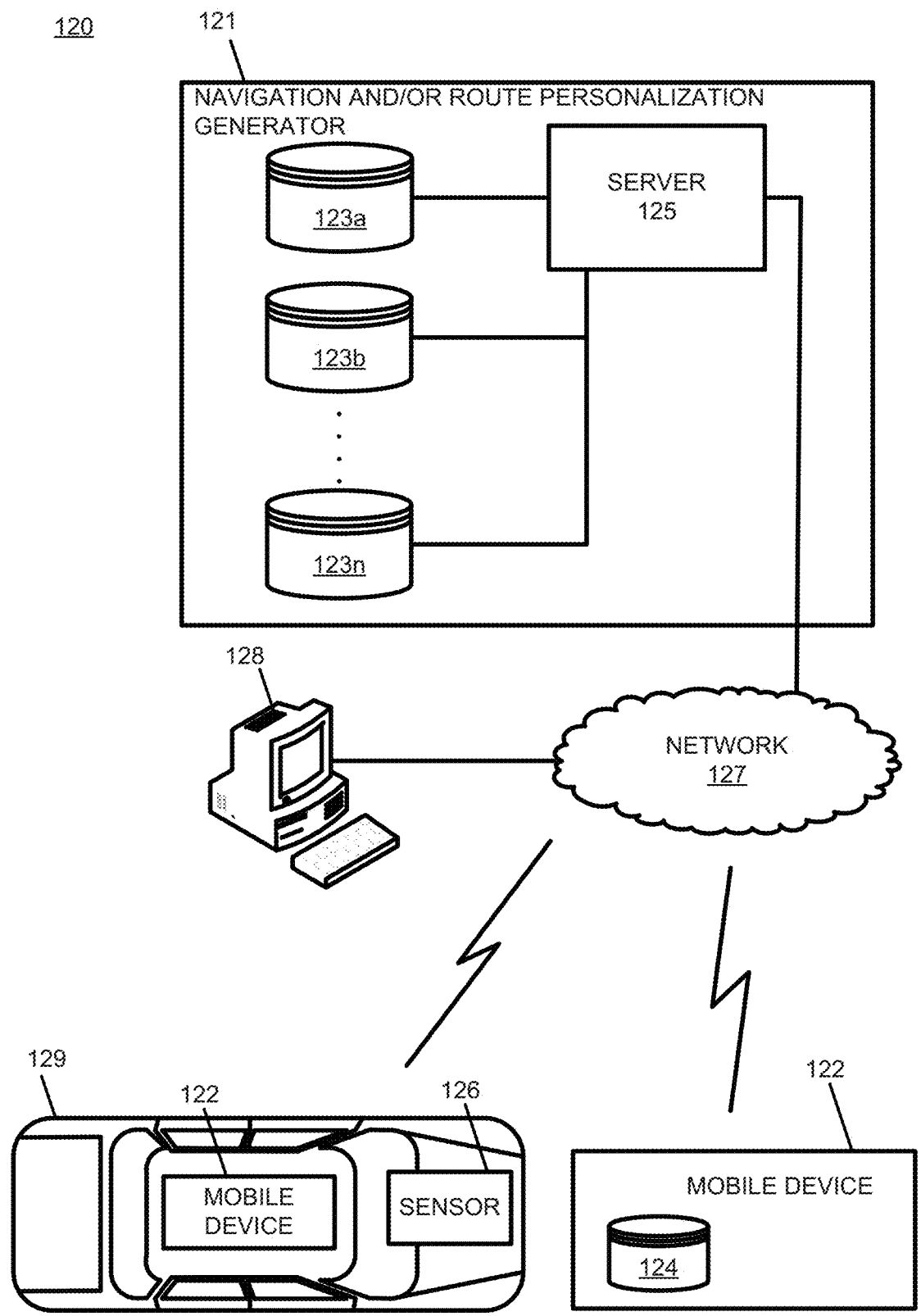
FIG. 6 illustrates example system of the subject technology for personalized estimation of travel time.

FIG. 6 illustrates one example system 120 for personalized estimation of travel time. The system 120 includes navigation and/or route personalization generator 121, one or more mobile devices 122 (navigation devices), a workstation 128, and a network 127. The system may further include a vehicle 129 including a mobile device 122 and a sensor 126. Additional, different, or fewer components may be provided. For example, many mobile devices 122 and/or workstations 128 connect with the network 127. The navigation and/or route personalization generator 121 includes a server 125 and one or more databases. The server 125 may maintain multiple databases 123a, 123b . . . 123n. The term database and refers to a set of data stored in a storage medium and may not necessarily reflect specific any requirements as to the relational organization of the data. The term "server" is used herein to collectively include the computing devices at the navigation and/or route personalization generator 121 for creating, maintaining, and updating the multiple databases 123a-123n. Any computing device may be substituted for the mobile device 122. The computing device may be a host for a website or web service such as a mapping service or a navigation service. A mapping service may provide maps generated from the databases 123a-123n using navigation and/or route personalization, and the navigation service may calculate routing or other directions from the geographic data, estimated arrival times, and route personalization of the databases 123a-123n.

Mobile device 122 and/or vehicle 129 may include processors and databases providing some or all of the services provided by navigation and/or route personalization generator 121. Local navigation and/or route personalization generator 121 of mobile device 122 may operate in tandem with remote navigation and/or route personalization generator 121 via network 127. As described herein, processing of navigation, route, estimated travel times, estimated time of arrival, driver profile, personalization correction value, personalized travel times, and personalized estimated time of arrival as described with reference to navigation and/or route personalization generator 121 additionally, alternatively, or jointly may be performed by navigation and/or route personalization generators disposed in or integral with mobile device 122 and/or vehicle 129.

Figure 8:
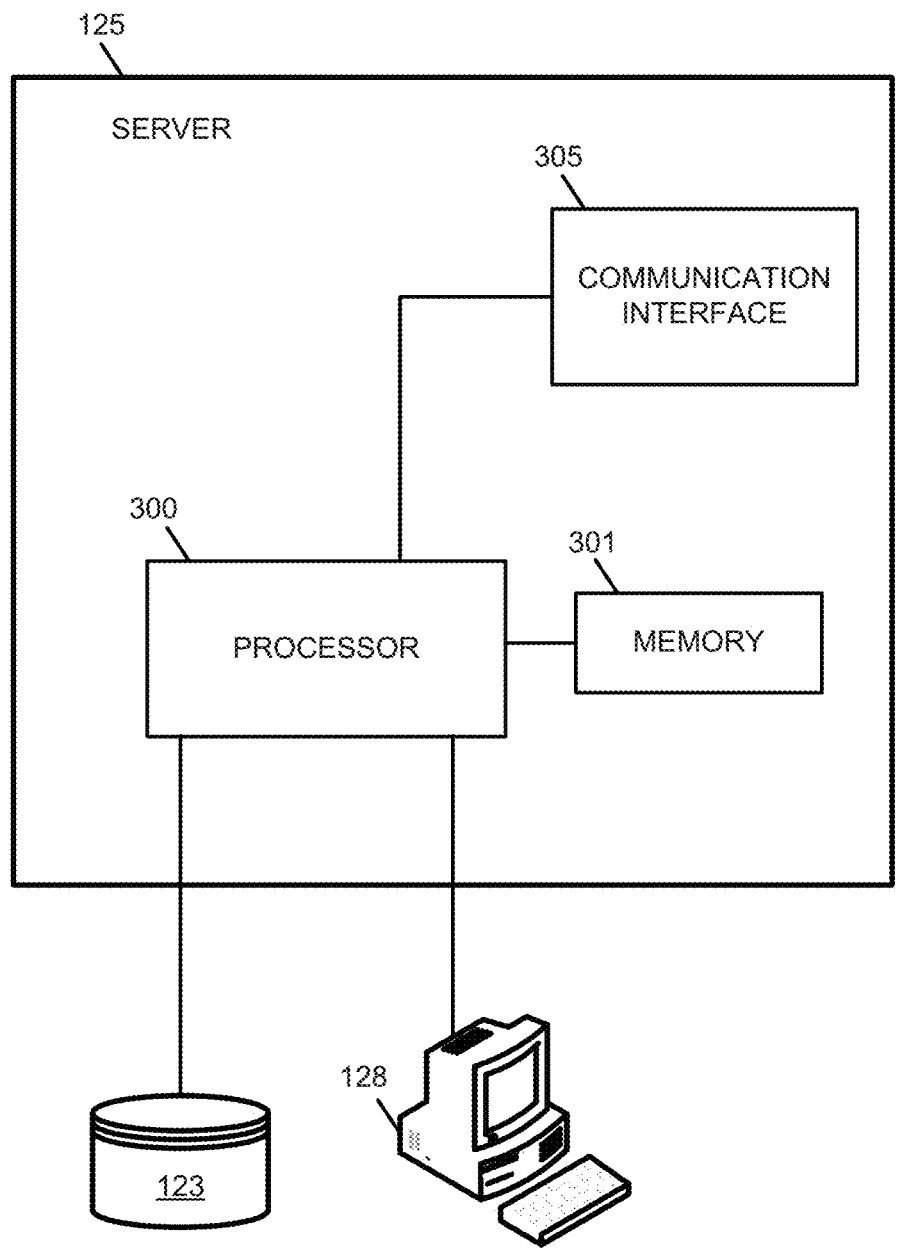
FIG. 8 illustrates an example server of the subject technology for non-rigid alignment.

The databases 123a-123n may include a navigation database that may include road element information, maneuver information, navigation information, traffic information, driver profile information, historical traffic information, road imagery including street level images, point cloud data, and/or existing map data. As shown in FIG. 8, a master copy of the database 123a may be stored at the navigation and/or route personalization generator 121, and the databases 123b-n may include alternative versions or past versions of aggregated, generalized driver profile information associated with navigation maps. The master copy of the database 123a may be the most current or up to date copy of the database. In addition, the mobile device 122 may store a local copy of the database 124. In one example, the local copy of the database 123b is a full copy of the database, and in another example, the local copy of the database 124 may be a cached or partial portion of the database.

The local copy of the database 124 located on mobile device 122 may include data from various versions of the database 123a-123n. The cached portion may be defined based on a geographic location of the mobile device 122 or a user selection made at the mobile device 122. The server 125 may send navigation and/or route personalization information to the mobile device 122.

The mobile device 122 may be a personal navigation device (PND), a portable navigation device smart phone, a mobile phone, a personal digital assistant (PDA), a car, a tablet computer, a notebook computer, and/or any other known or later developed connected device or personal computer. Non-limiting embodiments of navigation devices may also include relational database service devices, mobile phone devices, or car navigation devices. The vehicle 129 with mobile device 122 and sensor 126 may be an autonomous driving vehicle, a data acquisition vehicle, or a vehicle equipped with navigation or other communication capabilities.

The navigation and/or route personalization generator 121, the workstation 128, the mobile device 122, and vehicle 129 are coupled with the network 127. The phrase "coupled with" is defined to mean directly connected to or indirectly connected through one or more intermediate components. Such intermediate components may include hardware and/or software-based components.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 7:
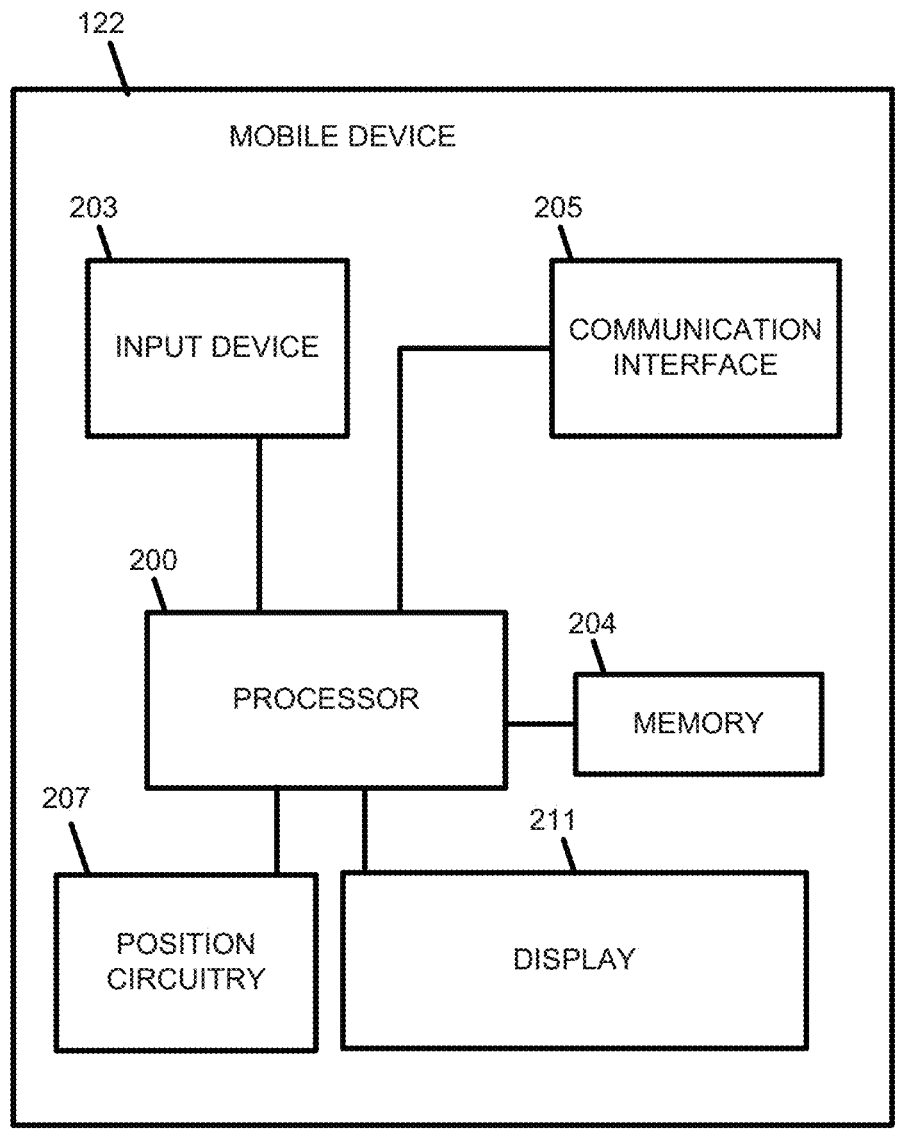
FIG. 7 illustrates an example mobile device of the subject technology for personalized estimation of travel time.

FIG. 7 illustrates an exemplary mobile device 122 of the system of FIG. 6. The mobile device 122 includes a processor 200, a memory 204, an input device 203, a communication interface 205, position circuitry 207, and a display 211. Additional, different, or fewer components are possible for the mobile device 122. FIGS. 1-3 illustrate example flow diagrams for the operation of mobile device 122 and processor 200. Additional, different, or fewer acts may be provided.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing. The processor 200 and/or processor 300 may include a navigation and/or route personalization generator. Mobile device 122 may receive and store map information, road element information, and maneuver information along with made metadata associated with these types of information. Processor 200 may receive route information via network 127 and calculate a route from the starting point to the destination point. Processor 200 may perform all estimation of travel times and estimation of arrival times locally on mobile device 122. Mobile device 122 may receive map and/or navigation information via network 127 identifying road elements, maneuvers, links information, traffic information, and other information via network 127. Processor 200 of mobile device 122 may calculate the estimated time of arrival value, determine a personalized correction value based on a driver profile stored on mobile device 122, and calculate a personalized time of arrival value based on the estimated time of arrival and the personalized correction. Processor 200 of mobile device 122 may additionally receive information associated with vehicle 129 and its ground truth, (i.e., actual travel time an actual route information associated with the trip). Processor 200 may then update and store the driver profile based on the data collected during the trip. Processor 200 of mobile device 122 may work in tandem with server 125 via network 127 to perform some or all of the estimated travel arrival time calculation, route determination, or personalized correction value determination.

Alternatively, processor 200 may be used to determine the driver profile and transmit anonymized and/or non-geographically specific and/or generalized time of day and or day of week information associated with driver profile information via network 127 for use with navigation and/or route personalization generator 121. Anonymized or non-geographically specific information associated with the driver profile information may be sent to network sent over network 127 to navigation and/or route personalization generator 121 such that driver information may be aggregated from multiple drivers using the system in order to determine generalized time estimations associated with road elements and maneuvers. Aggregated information received by navigation and/or route personalization generator 121 may be used in tandem with current traffic information stored in databases 123a-123n of navigation and/or route personalization generator 121.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 is configured to execute mapping algorithms to determine an optimum route to travel along a road network from an origin location or starting point to a destination location or destination point in a geographic region that may use maps including large scale scan information. Mobile device 122 may be configured to acquire imagery or other data along with geolocation and pose information. Using input from the end user, the navigation device 122 may examine potential routes between the origin location and the destination location to determine the optimum route. The navigation device 122 may then provide the end user with information about the optimum route in the form of guidance that identifies the maneuvers required to be taken by the end user to travel from the origin to the destination location in addition to estimated arrival time information, travel information, travel time information, and personalized arrival time information. Some navigation devices 122 show detailed maps on displays outlining the route, the types of maneuvers to be taken at various locations along the route, locations of certain types of features, and so on.

Using input from the driver or other passenger in the vehicle such as a starting point and/or a destination point, mobile device 122 may request and receive navigation information specifying road elements, maneuvers, and a route from the starting point to the destination point via network 127. Mobile device 122 also receive current traffic information via network 127.

FIG. 8 illustrates an example server 125. The server 125 includes a processor 300, a communication interface 305, and a memory 301. The server 125 may be coupled to one or more databases 123 and a workstation 128. The workstation 128 may be used to enter data regarding road element information, maneuver information, navigation information, traffic information, driver profile information, historical traffic information, road imagery including street level images, point cloud data, and/or existing map data. The databases 123 may include information entered from workstation 128. Additional, different, or fewer components may be provided in the server 125. FIGS. 1-3 illustrate example flow diagrams for the operation of server 125 and/or mobile device 122. Additional, different, or fewer acts may be provided.

The processor 300 and/or processor 200 may include a general processor, digital signal processor, ASIC, FPGA, analog circuit, digital circuit, combinations thereof, or other now known or later developed processor. The processor 300 and/or processor 200 may be a single device or combinations of devices, such as associated with a network, distributed processing, or cloud computing. The processor 300 and/or processor 200 perform operations associated with the navigation and/or route personalization generator. Server 125 may receive and store map information, road element information, maneuver information, aggregated driver information, driver profile information, personalization information, current traffic information, and metadata associated with these types of information.

Processor 300 may receive starting point, intermediate travel points, and/or destination points from mobile device 122 via network 127 and determine map information, road element information, maneuver information, aggregated driver information, driver profile information, personalization information, current traffic information, and metadata associated with the routes, road elements, and maneuvers between received points. Processor 300 may perform all estimation of travel times and estimation of arrival times at server 125. That is, server 125 may receive starting point information, intermediate points, and/or destination point information from mobile device 122 via network 127 and determine map and/or navigation information identifying road elements, maneuvers, links information, and traffic information. Processor 300 of server 125 may calculate the estimated time of arrival value, determine a personalized correction value based on a driver profile stored on database 123, and calculate a personalized time of arrival value based on the estimated time of arrival and the personalized correction value. Processor 300 of server 125 may additionally receive information associated with vehicle 129 and its ground truth, i.e., actual travel time an actual route information associated with the trip and/or information associated with sensors 126.

Processor 300 may update and store driver profile data records based on the data collected during a trip and/or send the driver profile information to mobile device 122. Processor 200 of mobile device 122 may work in tandem with processor 300 and server 125 via network 127 to perform some or all of the estimated travel arrival time calculation, route determination, or personalized correction value determination. Alternatively, processor 300 may be used to determine the driver profile by using received, anonymized and/or non-geographically specific information and/or generalized time of day and or day of week information associated with driver profile information provided through network 127 for use with navigation and/or route personalization generator 121. Anonymized or non-geographically specific information associated with the driver profile information may be sent to network sent over network 127 to navigation and/or route personalization generator 121 such that driver information may be aggregated from multiple drivers using the system in order to determine generalized time estimations associated with road elements and maneuvers. Aggregated information received by navigation and/or route personalization generator 121 may be used in tandem with current traffic information stored in databases 123a-123n of navigation and/or route personalization generator 121.

The memory 301 and/or memory 204 may be a volatile memory or a non-volatile memory. The memory 301 and/or memory 204 may include one or more of a read only memory (ROM), random access memory (RAM), a flash memory, an electronic erasable program read only memory (EEPROM), or other type of memory.

The communication interface 305 and/or communication interface 205 may include any operable connection. An operable connection may be one in which signals, physical communications, and/or logical communications may be sent and/or received. An operable connection may include a physical interface, an electrical interface, and/or a data interface. The communication interface 305 and/or communication interface 205 provides for wireless and/or wired communications in any now known or later developed format.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component or object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA or ASIC.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for estimation of travel time of a previously untraveled route, the method comprising:
   receiving a plurality of route information data records from a navigation system, wherein the plurality of route information data records is indicative of a plurality of road elements between a starting point and a destination point;
   determining a plurality of maneuvers between the starting point and the destination point based on a sequence of the plurality of road elements;
   establishing an estimated time of arrival value based on the plurality of route information data records, identifying a plurality of previously traversed trips traveled by a driver in a vehicle including a plurality of traveled road elements;
   identifying a categorical feature of each of the plurality of traveled road elements during the previously traversed plurality of trips, wherein the categorical feature represents mutually exclusive road properties;
   determining a driver profile based on the categorical feature of each of the plurality of traveled road elements during the previously traversed plurality of trips, and an actual time obtained traversing the identified categorical feature of each of the plurality of traveled road elements during the previously traversed plurality of trips;
   determining a personalized correction value based on the plurality of road elements, the plurality of maneuvers, and the driver profile, wherein the personalized correction value is estimated using a supervised regression model;
   calculating a personalized time of arrival value based on the estimated time of arrival value and the personalized correction value; and
   outputting a personalized previously untraveled route based on the personalized time of arrival value.

2. The method of claim 1 further comprising, storing the driver profile based on the categorical feature of each of the plurality of traveled road elements during the previously traversed plurality of trips.

3. The method of claim 1, wherein the mutually exclusive road property defines a type of terrain.

4. The method of claim 1, wherein the categorical feature of each of the plurality of traveled road elements is assigned a value.

5. The method of claim 1, wherein each of the plurality of maneuvers includes a movement executed on a roadway.

6. The method of claim 1, wherein the plurality of maneuvers reflects an experience level of the driver.

7. The method of claim 1, further comprising:
   identifying a maneuver type in the plurality of maneuvers executed by the driver during the plurality of trips;
   calculating maneuver times for the identified maneuver type; and
   aggregating the maneuver times for the identified maneuver type.

8. The method of claim 1, further comprising:
   defining a maneuver vector including a value for each of the plurality of maneuvers executed by the driver during the plurality of trips, wherein the driver profile includes the maneuver vector.

9. The method of claim 1, further comprising:
   defining a maneuver vector including a value for different types of maneuvers from the plurality of maneuvers executed by the driver during the plurality of trips, wherein the driver profile includes the maneuver vector.

10. The method of claim 1, wherein each of the plurality of maneuvers is defined by characteristics of movements.

11. An apparatus for estimation of travel time of an untraveled route according to experience level, the apparatus comprising:
    at least one processor; and
    at least one memory including computer program code for one or more programs; the at least one memory and the computer program code configured to, with the at least one processor, cause the apparatus to perform at least:
    receiving a plurality of route information data records from a navigation system, wherein the plurality of route information data records is indicative of a plurality of road elements between a starting point and a destination point;
    determining a plurality of maneuvers between the starting point and the destination point based on a sequence of the plurality of road elements;
    establishing an estimated time of arrival value based on the plurality of route information data records,
    identifying a plurality of previously traversed trips traveled by a driver in a vehicle including a plurality of traveled road elements;
    identifying a categorical feature of each of the plurality of traveled road elements during the previously traversed plurality of trips, wherein the categorical feature represents a mutually exclusive road properties;
    determining a driver profile based on the categorical feature of each of the plurality of traveled road elements during the previously traversed plurality of trips, and an actual time obtained traversing the identified categorical feature of each of the plurality of traveled road elements during the previously traversed plurality of trips;
    determining a personalized correction value based on the plurality of road elements, the plurality of maneuvers, and the driver profile, wherein the personalized correction value is estimated using a supervised regression model;
    calculating a personalized time of arrival value based on the estimated time of arrival value and the personalized correction value;
    and outputting a personalized previously untraveled route based on the personalized time of arrival value.

12. The apparatus of claim 11, the at least one memory and the computer program code configured to, with the at least one processor, cause the apparatus to at least:
    store the driver profile based on the categorical feature of each of the plurality of traveled road elements during the previously traversed plurality of trips.

13. The apparatus of claim 11, wherein mutually exclusive road properties define a type of terrain.

14. The apparatus of claim 11, wherein the categorical feature of each of the plurality of traveled road elements is assigned a value.

15. The apparatus of claim 11, wherein each of the plurality of maneuvers includes a movement executed on a roadway.

16. The apparatus of claim 11, wherein the plurality of maneuvers reflects an experience level of the driver.

17. The apparatus of claim 11, the at least one memory and the computer program code configured to, with the at least one processor, cause the apparatus to perform at least:
identifying a maneuver type in the plurality of maneuvers executed by the driver during the plurality of trips;
calculating maneuver times for the identified maneuver type; and
aggregating the maneuver times for the identified maneuver type.

18. The apparatus of claim 11, the at least one memory and the computer program code configured to, with the at least one processor, cause the apparatus to at least:
defining a maneuver vector including a value for each of the plurality of maneuvers executed by the driver during the plurality of trips, wherein the driver profile includes the maneuver vector.

19. A non-transitory computer readable medium including instructions that when executed are operable to perform a method comprising:
receiving a plurality of route information data records from a navigation system, wherein the plurality of route information data records is indicative of a plurality of road elements between a starting point and a destination point;
determining a plurality of maneuvers between the starting point and the destination point based on a sequence of the plurality of road elements;
establishing an estimated time of arrival value based on the plurality of route information data records,
identifying a plurality of previously traversed trips traveled by a driver in a vehicle including a plurality of traveled road elements;
identifying a categorical feature of each of the plurality of traveled road elements during the previously traversed plurality of trips, wherein the categorical feature represents mutually exclusive road properties;
determining a driver profile based on the categorical feature of each of the plurality of traveled road elements during the previously traversed plurality of trips, and an actual time obtained traversing the identified categorical feature of each of the plurality of traveled road elements during the previously traversed plurality of trips;
determining a personalized correction value based on the plurality of road elements, the plurality of maneuvers, and the driver profile, wherein the personalized correction value is estimated using a supervised regression model; and
calculating a personalized time of arrival value based on the estimated time of arrival value and the personalized correction value; and
outputting a personalized previously untraveled route based on the personalized time of arrival value.

20. The non-transitory computer readable medium of claim 19, wherein mutually exclusive road properties define a type of terrain.

* * * * *